US 11,234,132 B1

(12) United States Patent
Sicard et al.

(10) Patent No.: US 11,234,132 B1
(45) Date of Patent: Jan. 25, 2022

(54) AUTONOMOUS DEVICE AUTHENTICATION FOR PRIVATE NETWORK ACCESS

(71) Applicant: HEWLETT PACKARD ENTERPRISE DEVELOPMENT LP, Houston, TX (US)

(72) Inventors: Jerome Sicard, Berkeley Heights, NJ (US); Marta Vieyros Lorenzo, Calgary (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 8 days.

(21) Appl. No.: 16/937,381

(22) Filed: Jul. 23, 2020

(51) Int. Cl.
*H04W 12/06* (2021.01)
*H04W 4/70* (2018.01)
*H04W 12/72* (2021.01)
*H04W 12/37* (2021.01)

(52) U.S. Cl.
CPC ............ *H04W 12/72* (2021.01); *H04W 4/70* (2018.02); *H04W 12/06* (2013.01); *H04W 12/37* (2021.01)

(58) Field of Classification Search
CPC ....... H04W 12/72; H04W 4/70; H04W 12/37; H04W 12/06
See application file for complete search history.

(56) References Cited

U.S. PATENT DOCUMENTS

| | | | |
|---|---|---|---|
| 8,515,392 B2 | 8/2013 | Chen et al. | |
| 9,426,653 B2 | 8/2016 | Becker et al. | |
| 9,510,256 B2 | 11/2016 | Krishna et al. | |
| 10,820,202 B1* | 10/2020 | Gundavelli | H04W 4/24 |
| 11,134,071 B2* | 9/2021 | Kumar | H04L 9/3213 |
| 2017/0033823 A1* | 2/2017 | Smith | H04B 1/3816 |
| 2017/0149839 A1* | 5/2017 | Chahal | H04L 63/1416 |
| 2018/0034822 A1* | 2/2018 | Mistry | H04L 63/0853 |
| 2018/0206123 A1* | 7/2018 | Guday | H04W 8/245 |
| 2019/0253407 A1 | 8/2019 | Livanos et al. | |
| 2019/0327603 A1* | 10/2019 | De Figueiredo Junior | H04W 8/265 |
| 2019/0387021 A1* | 12/2019 | Wyatt | H04L 63/1466 |
| 2020/0162255 A1* | 5/2020 | Hunt | G06F 21/31 |
| 2020/0398062 A1* | 12/2020 | Ibarrola | A61N 1/3956 |
| 2021/0029119 A1* | 1/2021 | Raman | H04L 63/0884 |
| 2021/0049005 A1* | 2/2021 | Yehuda | G06F 9/44526 |
| 2021/0120000 A1* | 4/2021 | Pularikkal | H04L 63/083 |

OTHER PUBLICATIONS

Ericsson et al., "Extensible Authentication Protocol Method for 3rd Generation Authentication and Key Agreement (EAP-AKA)", Network Working Group, RFC4187, Jan. 2006, 79 pages.

(Continued)

*Primary Examiner* — Khawar Iqbal
(74) *Attorney, Agent, or Firm* — Hewlett Packard Enterprise Patent Department (57) ABSTRACT

Examples include solutions to onboard and seamlessly grant access to a network device to connect to an enterprise network. A request including enterprise credentials is received to access the enterprise network. The enterprise credentials are verified with an enterprise authentication server. A mapping between the device and the verified enterprise credentials are stored at an entitlement configuration server. The entitlement configuration server passes the enterprise credentials to a wireless controller upon receiving a request from the wireless controller for the device to access the enterprise network.

15 Claims, 8 Drawing Sheets

(56) References Cited

OTHER PUBLICATIONS

Gabriel Brown, "Integration of Career Wi-Fi Into the Mobile Packet Core", White Paper, Heavy Reading, Sep. 2012, pp. 1-15.
GSMA, "VoWiFi and VoLTE Entitlement Configuration", Version 2.0, GSM Association, Oct. 4, 2018, pp. 1-24.
Mobile Connect, "Mobile Connect: Mobile high-security authentication", GSMA, Sep. 2016, 16 pages.
Mobile Connect, "What is Mobile Connect?", Overview, GSMA, available online at <https://developer.mobileconnect.io/overview>, 2019, 5 pages.
Sakimura et al., "Final: OpenID Connect Core 1.0 incorporating errata set 1", available online at <https://openid.net/specs/openid-connect-core-1_0-final.html>, Nov. 8, 2014, 82 pages.
Unpublished U.S. Appl. No. 16/423,488, by Jerome Sicard, entitled "Entitlement Server Connected eSIMS", filed May 28, 2019.
Wi-Fi Alliance, "Discover Wi-Fi Passpoint: Seamless, secure connection to Wi-Fi® hotspot networks", available online at <https://www.wi-fi.org/discover-wi-fi/passpoint>, retrieved on Jul. 27, 2020, 5 pages.

\* cited by examiner

AUTONOMOUS DEVICE AUTHENTICATION FOR PRIVATE NETWORK ACCESS

BACKGROUND

An enterprise network may connect devices across departments and various other workgroup networks, and may otherwise facilitate the accessibility of data within an organization. Network access control solutions may be implemented to ensure that authorized devices may access the network. Prior to accessing the network, or prior to using network services, applications, or other similar resources, a user may request authorization for use thereof. Authorization may be provided by a trusted identity provider (IdP). In some instances, the IdP may be a third party authenticator preconfigured to accept authentication requests, and the process of federated authentication may include redirecting a user to the IdP. The IdP may accept credentials from the user, which may include a username, one-time passcode, biometrics, or any other form of credentials for verifying the identity of the resource requestor and/or the requesting device. The IdP may verify the credentials of the requesting user or device.

BRIEF DESCRIPTION OF THE DRAWINGS

The following detailed description references the drawings, wherein.

DETAILED DESCRIPTION

Connectivity to public access wireless networks has become more seamless and secure. Hotspot technology has enabled the connection of devices to public wireless local-area networks (WLAN) via wireless access points. Furthermore, with Hotspot 2.0 technology, mobile devices may be loaded with the correct credentials and security certificates prior to connecting to a public wireless network, and may seamlessly be authenticated and be connected to a network thereafter. Thus, a user may avoid manually entering credentials each time they request a connection to a network. Specifically, a SIM may include a mobile subscription profile and/or authentication keys of an end user. These credentials may identify the user and the associated voice and data services offered by the Mobile Carrier and otherwise available to the user.

In the case of cellular networks, mobile devices may include a user's credentials in their physical Subscription Information Module (SIM) card or embedded or electronic SIM (eSIM), both referred to herein as a "SIM." SIM devices may be manufactured without an operational communication profile. As part of an onboarding process, a Sim may be loaded with a profile from a Mobile Network Operator (MNO), e.g., following GSMA Remote SIM Provisioning (RSP) procedures. A device may download the profile from a subscription manager, such as an SM-DP+.

With these credentials, an MNO may also behave as an Identity Provider (IdP) as described above. An MNO may be a provider of communication services. Specifically, an MNO may offer voice and data connectivity services for both individual consumers as well as entities such as enterprises. An MNO, responsive to a user request to connect to a wireless network from the user's mobile device, may leverage user credentials on the SIM to perform identification and authentication services for connecting and otherwise "logging in" to a Wireless Fidelity (Wi-Fi) network.

In the case of MNO authentication for access to a public wireless network, connection to the network may be automatic. A user for instance, may not need to manually enter user credentials because the authentication process involves an Extensible Authentication Protocol (EAP) handshake between the SIM of the device, the Wi-Fi access network, and the MNO's authentication server. Accordingly, an MNO may in some instances provide secure and automated authentication for connection of a device to a public Wi-Fi network.

Figure 1:
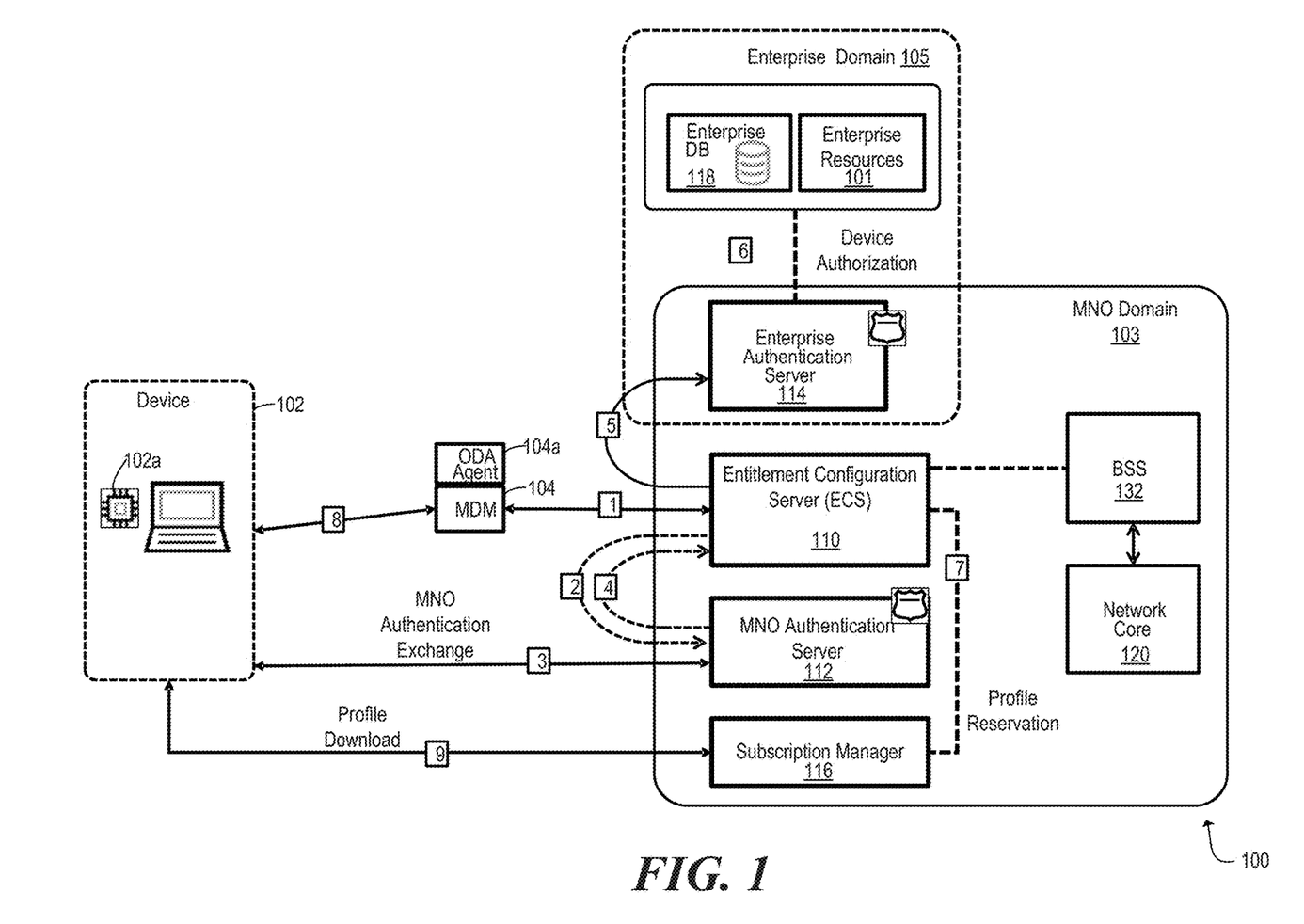
FIG. 1 is a block diagram illustrating an example system for onboarding a network device.
Figure 2:
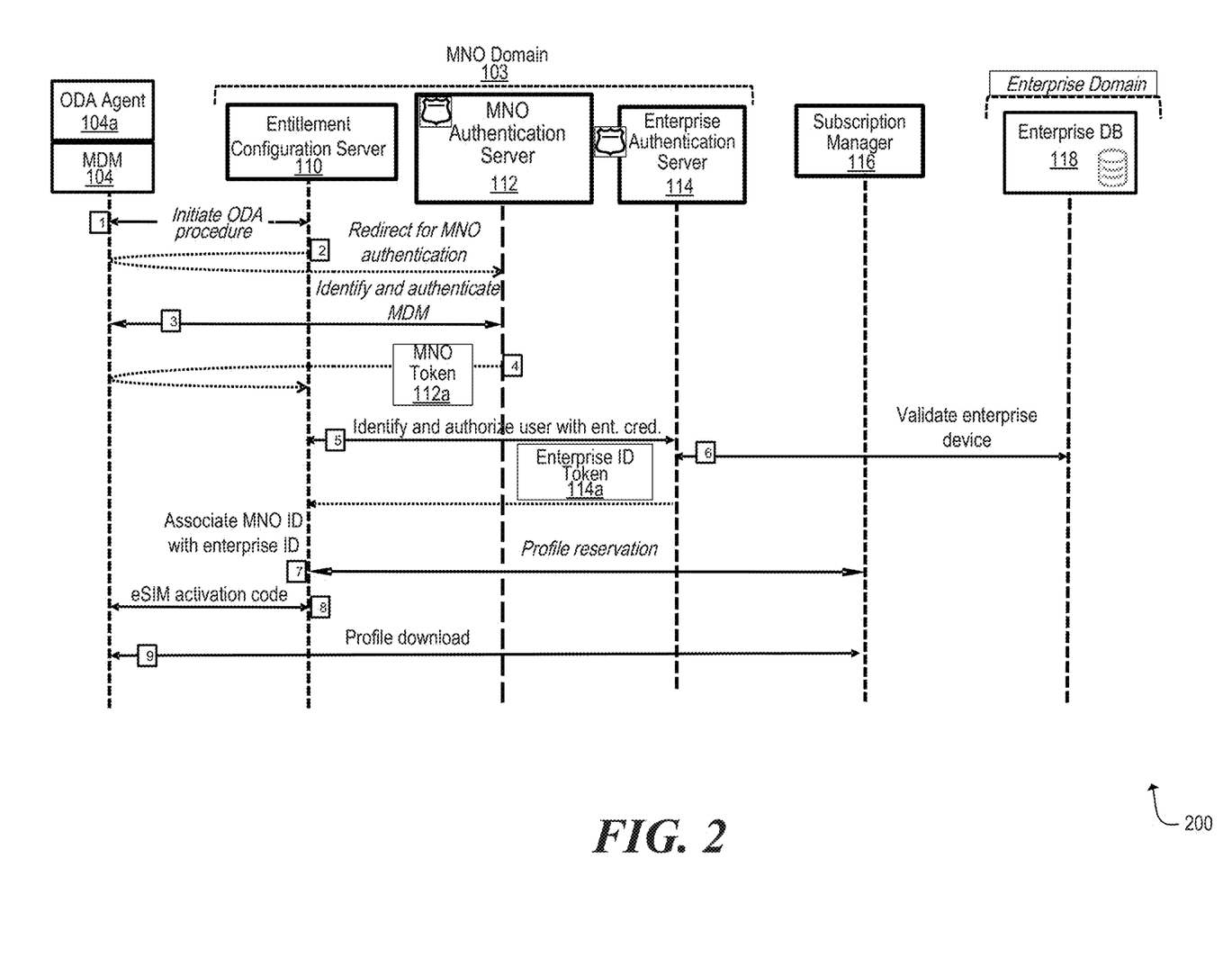
FIG. 2 is a sequence diagram illustrating example steps for onboarding a network device.

A solution is provided herein for securely and seamlessly accessing a private network, such as an enterprise network. Specifically, a system and method is provided for onboarding a network device, and, once onboarded, automatically authenticating the network device responsive to a request to access a private network, such as an enterprise network. FIG. 1 is a block diagram illustrating an example system 100 for onboarding a network device. FIG. 2 is a sequence diagram 200 illustrating example steps carried out by the components illustrated at FIG. 1 for onboarding the network device. Together, FIG. 1 and FIG. 2 illustrate example steps 1-9 for onboarding a network device. Network device 102, may include any computing device able to access a network. Network device 102 may be, for example, a wireless mobile device able to access both a cellular network and a Wi-Fi network.

Mobile Device Manager (MDM) 104 may initiate SIM activation for device 102. MDM 104 may be a platform for onboarding and configuring devices for access to an enterprise network. MDM 104 in some examples may further set the various functions and/or features of device 102 based on device policies set by an enterprise. For instance, MDM 104 may include functionality for enterprise data segregation, data and document security, policy enforcement, and/or device integration and management for device 102. MDM 104 may for example, pass an enterprise SIM profile from an MNO to device 102. MDM 104 may further enable the distribution of applications, policies, data, and/or other configuration settings for device 102. MDM 104 may include an on-premise or cloud based server for transmitting data, system configurations, commands, etc., to device 102. MDM 104 may further include a client that may operate on device 102 and receives and/or otherwise implements the received data, system configurations, commands, etc. The server and client may be managed together, e.g. by the MNO, or by separate entities.

MDM 104 may further include an On-Device Activation (ODA) agent 104a for facilitating the SIM 102a activation of device 102. ODA agent 104a may be, for example, a module of MDM 104 which may implement an ODA protocol, e.g. Global System for Mobile Communications Association (GSMA) TS.43, for activation of Sim 102a. To initiate Sim activation for device 102, MDM 104 may for example, send an on-device activation request to Entitlement Configuration Server (ECS) 110.

ECS 110 may be a gateway that passes communications between device 102 and an MNO core network 120. ECS 110 may process device-related requests to entitle and/or configure features or services on device 102. ECS 110 may further orchestrate the handling of requests between device 102 and/or MDM 104, and MNO domain 103. ECS 110 may receive a request from MDM 104 to access a private network, such as an enterprise network. In other words, MDM 104 may initiate an onboarding of device 102 by requesting an activation of SIM 102a.

ECS, upon receiving the request, may redirect the request to MNO authentication server 112. MNO authentication server 112 may be disposed at MNO domain 103 and may authenticate devices, applications, and/or user credentials. For instance, MNO authentication server 112 may authenticate resource requests, such as requests from MDM 104, using standard authorization protocols, e.g. OAuth 2.0 exchange.

ECS 110 may thereby facilitate an exchange between MDM 104 and MNO authentication server 112. MNO authentication server 112 may validate MDM 104 upon confirming that MDM 104 has provided proper credentials. Upon validating MDM 104, ECS 110 may receive an MNO authentication token 112a from MNO authentication server 112. ECS 110 may store MNO authentication token 112a for future communications between ECS 110 and MDM 104, such that ECS 110 may refer to token 112a for validation of MDM 104 upon future requests from MDM 104.

Mobile Device Manager (MDM) 104 may transmit enterprise credentials of device 102 to ECS 110. In an example, MDM 104 may transmit the enterprise credentials of device 102 upon initiating SIM activation for device 102, e.g. accompanied with the request for activation to ECS 110. In another example implementation, MDM 104 may transmit the enterprise credentials of device 102 to ECS 110 upon the authentication of MDM 104 by ECS 110.

The enterprise credentials of device 102 may include, in some examples, a device identifier (ID) of device 102. Device ID of device 102 may be a unique identifier, such as a unique string of alphanumeric characters, to uniquely identify device 102. The device ID may be globally unique in some instances, and may, for example, map to a specific end user. Where the device is an enterprise device, the device ID may be unique to the enterprise. Enterprise credentials of device 102 may further include an enterprise ID in some examples. The enterprise ID may be private access credentials of a user, such as an employee, customer ect., to access an enterprise network, services, or other resources 101 under management of the enterprise. An enterprise ID may include, in some examples, a registered email and password, an employee ID number, or other credentials granted to a specific individual or entity for access to an enterprise network.

Entitlement Configuration Server (ECS) 110 may validate the enterprise credentials received from MDM 104. For instance, ECS 110 may pass the enterprise credentials to an Enterprise Authentication Server (EAS) 114. EAS 114 may be dedicated hardware, software, or a combination therefore to authorize requests for access to an enterprise network and/or enterprise resources 101. EAS 114 may reside in a dedicated computer, an Ethernet switch, an access point, or a network access server to name a few examples. Furthermore, EAS 114 may reside within enterprise domain 105, as illustrated at example FIG. 1, at MNO Domain 103, or may otherwise be distributed across either domain.

Responsive to receiving the enterprise credentials from ECS 110, EAS 114 may validate and otherwise authorize the enterprise credentials, e.g. the enterprise ID and/or device ID. In some examples, EAS 114 may pass the enterprise credentials to a subscription manager 116 of the enterprise, such as an SM-DP+ as prescribed in GSMA Remote SIM Provisioning (RSP) standards. The SM-DP+ may manage the communication profiles for consumer SIM devices. Specifically, profiles may be reserved and bound to a SIM using ES9+ protocols for examples. These profiles may be downloaded by a device's SIM using via the ES9+ protocols. Subscription manager 116 may reside at the enterprise domain 105, the MNO domain 103, or any combination thereof. Subscription manager 116 may verify the credentials against a list of authorized credentials at an enterprise database 118, for example, and may pass the results back to EAS 114. In some examples, EAS 114 may independently validate the enterprise credentials.

EAS 114 may validate the enterprise credentials and, responsive to the validation, may pass an enterprise identity (ID) token 114a to ECS 110 to confirm the validation. ECS 110 may store enterprise ID token 114a. Specifically, ECS 110 may create a record for device 102. For instance, ECS 110 may create an MNO identity that points to a subscription or account record for device 102. The record may include a mapping between device 102 and the verified enterprise credentials.

In an example, the stored record of device 102 may include the received enterprise credentials, such as the enterprise ID and device ID described above, as well as the received authentication tokens, including MNO token 112a and enterprise ID token 114a. The record may further include an MNO Subscription ID.

The MNO Subscription ID may be a unique identity from the Mobile Operator, and may generally be referred to as a mobile subscriber identity, or international mobile subscriber identity (IMSI). The IMSI is a unique number that identifies a Global System for Mobile Communications (GSM) subscriber, i.e. a user of a cellular network. Thus, the unique identity from the MNO may now be mapped to an enterprise identity.

Upon associating the enterprise identity with the MNO subscription ID, ECS 110 may reserve a communication profile from subscription manager 116. As described above with reference to a SM-DP+ subscription manager, profiles may be reserved and bound to a SIM using ES9+ protocol and downloaded thereafter via the SIM of the device.

ECS 110 may create a SIM activation code, which is passed back to MDM 104. The activation code may contain information for obtaining the communication profile, e.g. as described in GSMA Remote SIM Provisioning (RSP) procedures. MDM 104 may thereafter instruct device 102 to download the communication profile with the SIM activation code, and device 102 may download the communication profile, e.g. via a ES9+ interface to the SM-DP+ subscription manager. Accordingly, the network device 102 may be onboarded such that ECS 110 maintains a mapping between device 102 and verified enterprise credentials for future autonomous access.

Figure 3:
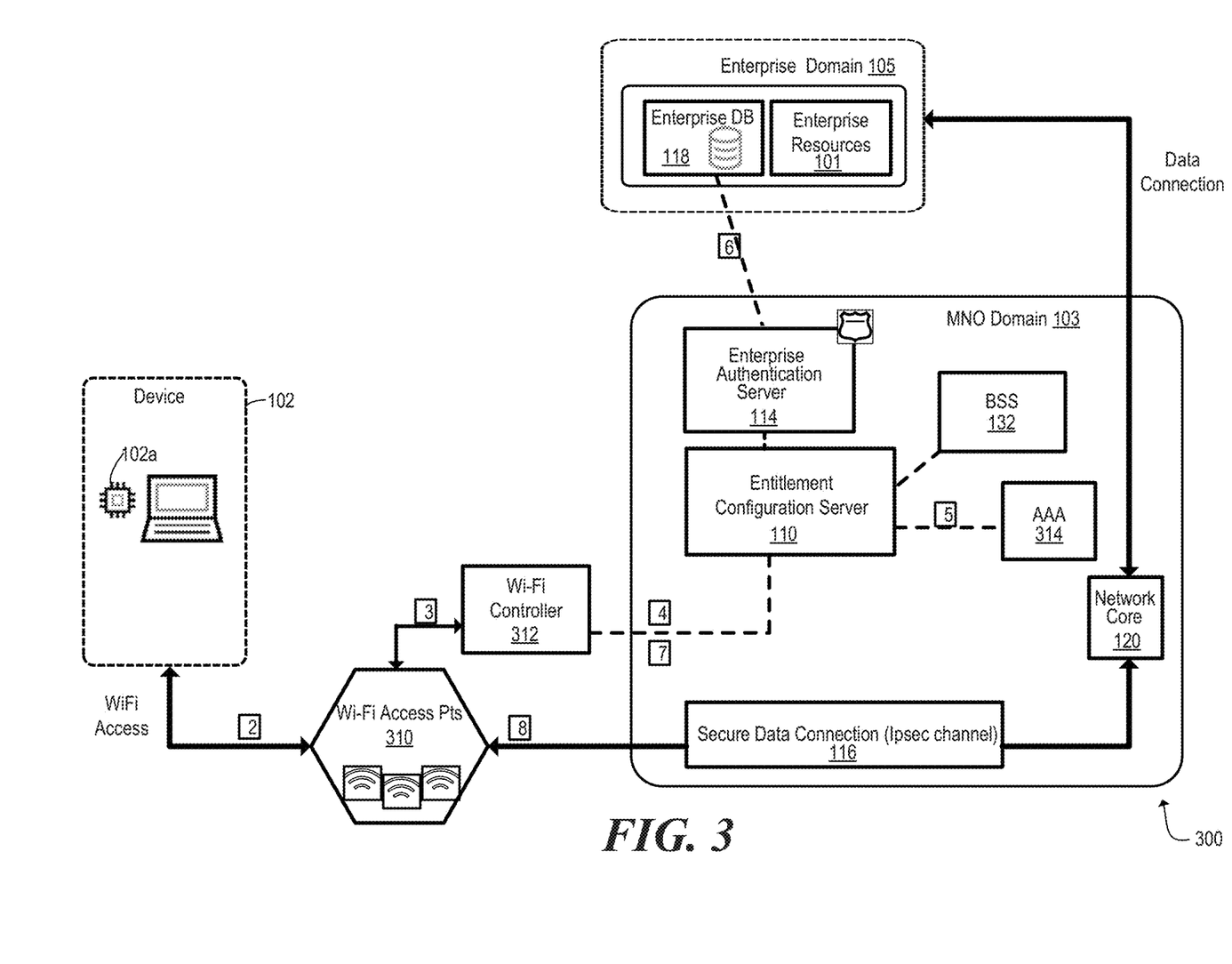
FIG. 3 is a block diagram illustrating an example system for granting a network device access to an enterprise network.
Figure 4:
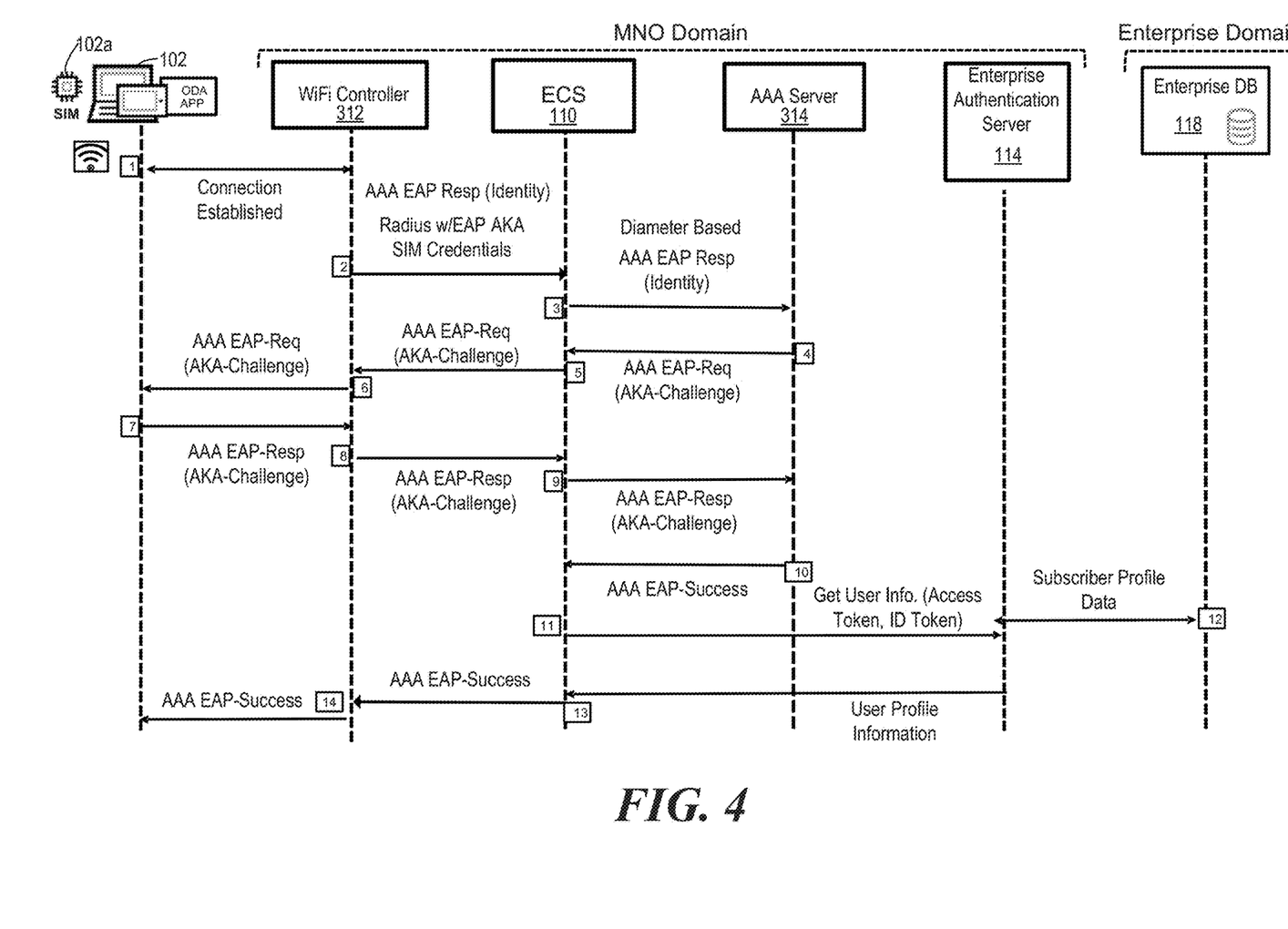
FIG. 4 is a sequence diagram illustrating example steps for granting a network device access to an enterprise network.

FIG. 3 is a block diagram illustrating an example system 300 for granting a network device access to an enterprise network. FIG. 4 is a sequence diagram 400 illustrating example steps carried out by the components illustrated at FIG. 3 for granting enterprise network access to the device. For purposes of clarity and conciseness, FIG. 4 will be described in conjunction with FIG. 3. FIG. 3 may include similar architecture to system 100, including device 102 having SIM 102a, ECS 110, Enterprise Authentication Server (EAS) 114, Basic Service Set (BSS) 132, and network core 120 of MNO Domain 103, and enterprise database 118 and enterprise resources 101 of enterprise domain 105. As discussed above with respect to FIG. 1 and FIG. 2, network device 102 may be onboarded such that ECS 110 maintains a mapping between device 102 and verified enterprise credentials. By mapping the device identifier of device 102 with the enterprise credentials, the Mobile Network Operator (MNO) may seamlessly identify and validate wireless access requests from device 102.

Steps 1-13 of FIG. 4 enable the MNO to authenticate the device using the SIM 102a secure credentials, e.g. based on EAP-AKA exchanges over RADIUS and Diameter. Device 102, after being onboarded, may connect to Wi-Fi controller 312, e.g. via Wi-Fi Access Point 310 of FIG. 3. In an example implementation, device 102 may be authenticated by Wi-Fi controller 312, e.g. via standard authentication protocols such as Extensible Authentication Protocol (EAP). The Wi-Fi controller may then exchange standards-based authentication commands with EAP-AKA payloads from SIM 102a of device 102 with ECS 110. In an example, the exchange may be on top of a Remote Authentication Dial-In User Service (RADIUS) authentication protocol, a standard networking application layer protocol that provides centralized Authentication, Authorization, and Accounting (AAA) management for connecting to a network service. In other words, ECS 110 may receive the RADIUS AAA message from the Wi-Fi controller.

ECS 110, in an example implementation, may include a client for communicating with a AAA server, e.g. server 314. From the stored mapping at ECS 110, ECS 110 may pull the stored enterprise credentials of device 102, e.g. the MNO token 112a, and enterprise Identity (ID) token 114a, and may exchange AKA-based authentication credentials with AAA server 314, as well as with Enterprise Authentication Server 114. ECS 110 may further facilitate the passing of a AAA EAP-request challenge received from AAA server 314 to Wi-Fi controller 312 and ultimately to device 102. ECS 110 may further facilitate the passing of the challenge response back from device 102 to AAA server 314. A notification of successful authentication may be passed from AAA server 314 to ECS 110.

ECS 110 may further request subscriber profile information from Enterprise Authentication Server (EAS) 114. EAS 114 may query an enterprise database, e.g. enterprise database 118, for the subscriber profile data. For example, Enterprise Authentication Server 114 may return subscriber data including subscriber type and/or subscriber subtypes, access level permissions, active services for device 102, etc. This user profile data may be returned to ECS 110.

Upon successful authentication, a final "accept connect" message may be transmitted back from ECS 110 to Wi-Fi controller 312. This "accept connect" message transmitted to Wi-Fi controller 312 may, for example, include the enterprise identifier and device identifier, e.g. embedded according to RADIUS parameters. Wi-Fi controller 312, having these identifiers, may define and/or implement enterprise-level policies dictating the connection between device 102 and the enterprise domain, e.g. enterprise domain 105 of FIG. 1. For example, Wi-Fi controller 312 may regulate access to enterprise resources 101 by device 102. In some example implementations, Wi-Fi controller 312 may direct device 102 to a unique private network of the enterprise. Some other example policies may include providing specified network connections such as a greater or lower bandwidth than a default bandwidth, security enhancements, or access to premium enterprise applications or services. Accordingly, ECS 110 may facilitate an automatic login by device 102 to an enterprise network with unique subscriber access policies enforced by Wi-Fi controller 312.

Figure 5:
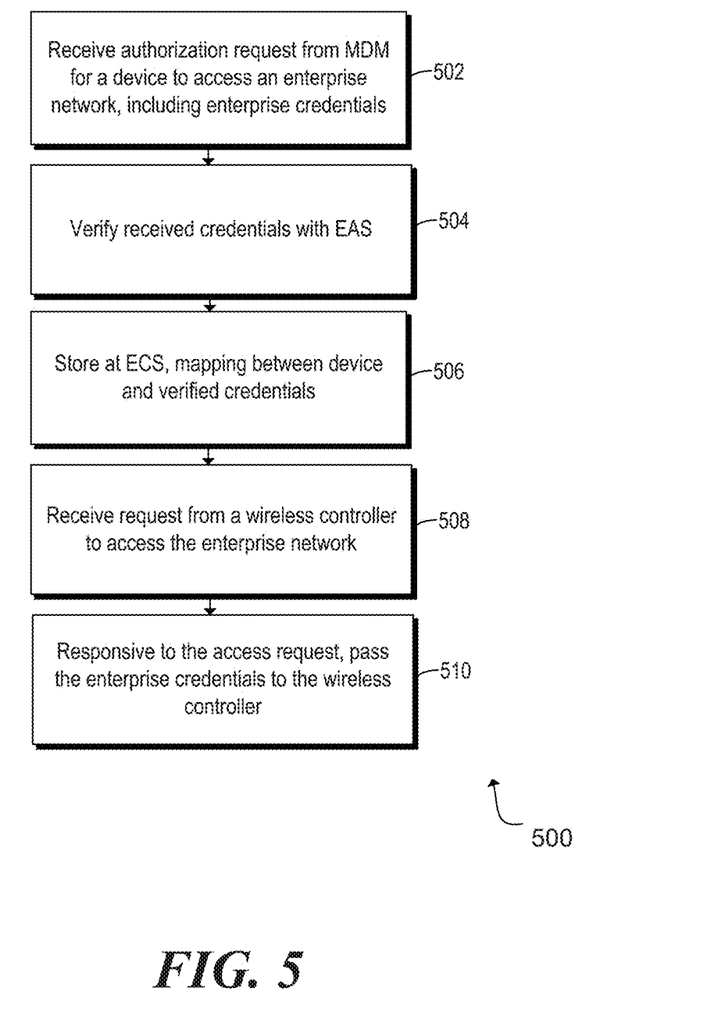
FIG. 5 is an example method for granting a network device access to an enterprise network.
Figure 6:
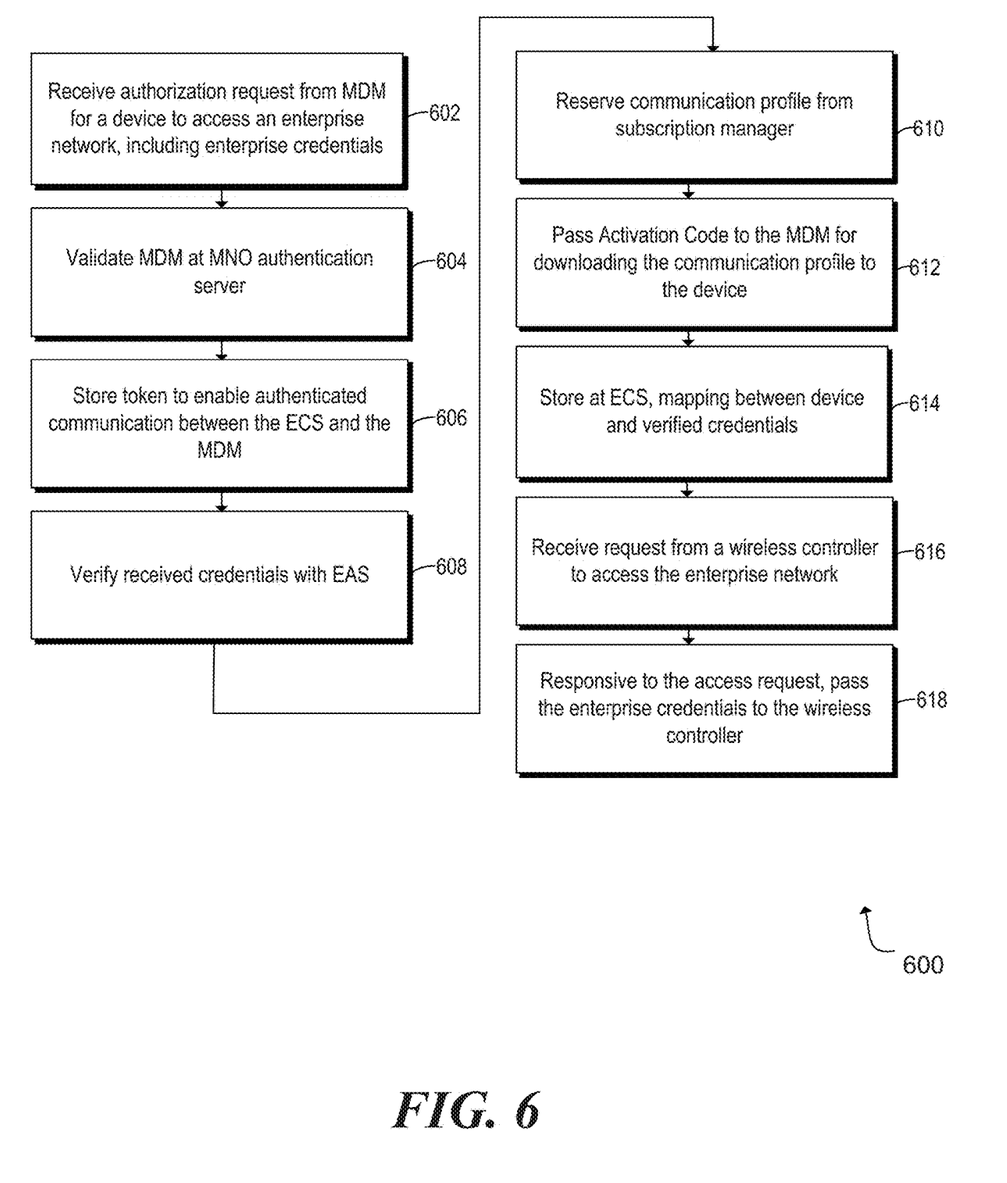
FIG. 6 is another example method for granting a network device access to an enterprise network.

FIG. 5 and FIG. 6 are example methods, 500 and 600 respectively, for granting a network device access to an enterprise network. Execution of method 500 and method 600 is described below with reference to system 100 and 300 of FIGS. 1 and 3; however, this is for explanatory purposes and other suitable components for execution of method 500 and/or method 600 may be utilized. Additionally, the components for executing method 500 and/or method 600 may spread among multiple devices. Method 500 and/or method 600 may be implemented in the form of executable instructions stored on a non-transitory machine-readable storage medium and/or in the form of electronic circuitry, e.g. hardware. In some examples, steps of method 500 and/or method 600 may be executed substantially concurrently or in a different order than shown in FIG. 5 and FIG. 6 respectively. In some examples, method 500 and/or method 600 may include more or less steps than are shown in FIG. 5 and FIG. 6 respectively. In some examples, some of the steps of method 500 and/or method 600 may, at certain times, be ongoing and/or may repeat.

Turning to method 500 of FIG. 5, at block 502, an authorization request may be received for a device to access a private network, such as an enterprise network. In an example implementation, the authorization request may be received from a Mobile Device Manager (MDM) 104. For instance, the MDM 104 may be a platform for onboarding and configuring devices for access to an enterprise network. MDM 104 in some examples may further set the various functions and/or features of the device requesting access based on device policies set by an enterprise, including functionality for enterprise data segregation, data and document security, policy enforcement, and/or device integration and management for the device. MDM 104 may include an on-premise or cloud based server for transmitting data, system configurations, commands, etc., to the device requesting access to the enterprise network. MDM 104, in some examples, may include a client that may operate on the requesting device and receives and/or otherwise implements the received data, system configurations, commands, etc. The server and client may be managed together, e.g. by the MNO, or by separate entities.

The authorization request received at block 502 may facilitate the activation of a SIM of the requesting device. To initiate Sim activation for device 102, MDM 104 may for example, send an on-device authorization request to Entitlement Configuration Server (ECS) 110.

In some examples, the authorization request may include enterprise credentials. For instance, Mobile Device Manager (MDM) 104 may transmit enterprise credentials of device 102 to ECS 110. In an example, MDM 104 may transmit the enterprise credentials of device 102 upon initiating SIM activation for device 102, e.g. accompanied with the request for activation to ECS 110. In another example implementation MDM 104 may transmit the enterprise credentials of device 102 to ECS 110 upon the authentication of MDM 104 by ECS 110.

The enterprise credentials of device 102 may include, in some examples, a device identifier (ID) of device 102. Device ID of device 102 may be a unique identifier, such as a unique string of alphanumeric characters, to uniquely identify device 102. The device ID may be globally unique in some instances, and may, for example, map to a specific end user. Where the device is an enterprise device, the device ID may be unique to the enterprise. Enterprise credentials of device 102 may further include an enterprise ID in some examples. The enterprise ID may be private access credentials of a user, such as an employee, customer, ect., to access an enterprise network, services, or other resources 101 under management of the enterprise. An enterprise ID may include, in some examples, a registered email and password, an employee ID number, or other credentials granted to a specific individual or entity for access to an enterprise network.

At block 504, the enterprise credentials may be verified. For example, the enterprise credentials may be verified by an Enterprise Authentication Server (EAS). Responsive to receiving the enterprise credentials from ECS 110, EAS 114 may validate and otherwise authorize the enterprise credentials. EAS 114 may validate the enterprise credentials and, responsive to the validation, may pass an enterprise identity (ID) token 114*a* to ECS 110 to confirm the validation.

At block 506, ECS 110 may store a mapping between device 102 and the verified credentials. For instance, ECS 110 may store a received enterprise ID token 114*a* and may create a record for device 102. In some examples, ECS may create an MNO identity that points to a subscription or account record for device 102. The record may include a mapping between device 102 and the verified enterprise credentials.

In some examples, the stored record of device 102 may include the received enterprise credentials, such as the enterprise ID and device ID described above, as well as the received authentication tokens, including MNO token 112*a* and enterprise ID token 114*a*. The record may further include an MNO Subscription ID. The MNO Subscription ID may be a unique identity from the Mobile Operator, and may generally be referred to as a mobile subscriber identity, or international mobile subscriber identity (IMSI). The IMSI is a unique number that identifies a Global System for Mobile Communications (GSM) subscriber, i.e. a user of a cellular network. Thus, the unique identity of the device from the MNO may be mapped to an enterprise identity.

At block 508, a request may be received from a wireless controller, e.g. a Wi-Fi controller to access the enterprise network. For example, device 102, after being onboarded, may connect to Wi-Fi controller 312, e.g. via Wi-Fi Access Point 310 of FIG. 3. In an example implementation, device 102 may be authenticated by Wi-Fi controller 312, e.g. via standard authentication protocols such as Extensible Authentication Protocol (EAP). The Wi-Fi controller may then exchange standards-based authentication commands with EAP-AKA payloads from SIM 102*a* of device 102 with ECS 110. In an example, the exchange may be on top of a Remote Authentication Dial-In User Service (RADIUS) authentication protocol, a standard networking application layer protocol that provides centralized Authentication, Authorization, and Accounting (AAA) management for connecting to a network service. In other words, ECS 110 may receive the access request, e.g. in the form of a RADIUS AAA message, from the Wi-Fi controller.

ECS 110, in an example implementation, may include a client for communicating with a AAA server, e.g. server 314. From the stored mapping at ECS 110, ECS 110 may pull the stored enterprise credentials of device 102, e.g. the MNO token 112*a*, and enterprise Identity (ID) token 114*a*, and may, in some example implementations, exchange AKA-based authentication credentials with AAA server 314, as well as with Enterprise Authentication Server 114.

At block 510, enterprise credentials may be passed to the wireless controller responsive to the access request. For instance, upon successful authentication, ECS 110 may transmit a final "accept connect" message back to Wi-Fi controller 312. This "accept connect" message transmitted to Wi-Fi controller 312 may, for example, include the enterprise identifier and device identifier, e.g. embedded according to RADIUS parameters. Wi-Fi controller 312, having these identifiers, may, in some example instances, define and/or implement enterprise-level policies dictating the connection between device 102 and the enterprise domain, e.g. enterprise domain 105 of FIG. 1. For example, Wi-Fi controller 312 may regulate access to enterprise resources 101 by device 102. In some example implementations, Wi-Fi controller 312 may direct device 102 to a unique private network of the enterprise. Some other example policies may include providing specified network connections such as a greater or lower bandwidth than a default bandwidth, security enhancements, or access to premium enterprise applications or services. Accordingly, a method is provided for automatic login by a device to a private network such as an enterprise network.

Turning to method 600 of FIG. 6, an authorization request for a device to access an enterprise network may be received at block 602. In an example implementation, the authorization request may be received from a Mobile Device Manager (MDM) 104, as described above. The authorization request received at block 602 may facilitate the activation of a SIM of the requesting device. To initiate Sim activation for device 102, MDM 104 may for example, send an on-device authorization request to Entitlement Configuration Server (ECS) 110.

In some examples, the authorization request may include enterprise credentials. For instance, Mobile Device Manager (MDM) 104 may transmit enterprise credentials of device 102 to ECS 110. In an example, MDM 104 may transmit the enterprise credentials of device 102 upon initiating SIM activation for device 102, e.g. accompanied with the request for activation to ECS 110. In another example implementation MDM 104 may transmit the enterprise credentials of device 102 to ECS 110 upon the authentication of MDM 104 by ECS 110.

The enterprise credentials of device 102 may include, in some examples, a device identifier (ID) of device 102. Device ID of device 102 may be a unique identifier, such as a unique string of alphanumeric characters, to uniquely identify device 102. The device ID may be globally unique in some instances, and may, for example, map to a specific end user. Where the device is an enterprise device, the device ID may be unique to the enterprise. Enterprise credentials of device 102 may further include an enterprise ID in some examples. The enterprise ID may be private access credentials of a user, such as an employee, customer ect., to access an enterprise network, services, or other resources 101 under management of the enterprise. An enterprise ID may include, in some examples, a registered email and password, an employee ID number, or other credentials granted to a specific individual or entity for access to an enterprise network.

At block 604, MDM 104 may be validated. For example, ECS 110 upon receiving the request, may redirect the request to MNO Authentication server 112. Authentication server 112 may be disposed at MNO domain 103 for example, and may authenticate devices, applications, and/or user credentials. For instance, authentication server 112 may authenticate resource requests, such as requests from MDM 104, using standard authorization protocols, e.g. OAuth 2.0 exchange. MNO authentication server 112 may validate MDM 104 upon confirming that MDM 104 has provided proper credentials.

At block 606 an authentication token may be stored responsive to the validation of the MDM to enable authenticated communication with the MDM. For example, upon validating MDM 104, ECS 110 may receive an MNO authentication token 112a from MNO authentication server 112. ECS 110 may store MNO authentication token 112a for future communications between ECS 110 and MDM 104, such that ECS 110 may refer to token 112a for validation of MDM 104 upon future requests from MDM 104 without having to authenticate the MDM with the MNO Authentication server 112 first.

At block 608, the enterprise credentials may be verified. For example, the enterprise credentials may be verified by an Enterprise Authentication Server (EAS). Responsive to receiving the enterprise credentials from ECS 110, EAS 114 may validate and otherwise authorize the enterprise credentials. EAS 114 may validate the enterprise credentials and, responsive to the validation, may pass an enterprise identity (ID) token 114a to ECS 110 to confirm the verification.

At block 610, a communication profile may be reserved from a subscription manager for onboarding the device 102. For example, upon associating the enterprise identity with the MNO subscription ID, ECS 110 may reserve a communication profile from subscription manager 116. As illustrated in example system 100, subscription manager 116 may be part of MNO Domain 103. Profiles, as described above with reference to a SM-DP+ subscription manager, may be reserved and bound to a SIM using ES9+ protocol and downloaded thereafter via the SIM of the device.

At block 612, an activation code may be passed to the MDM. The activation code may enable device 102 to download the communication profile. Specifically, the activation code may contain information for obtaining the communication profile, e.g. as described in GSMA Remote SIM Provisioning (RSP) procedures. MDM 104, after receiving the activation code from ECS 110, may thereafter instruct device 102 to download the communication profile with the SIM activation code, and device 102 may download the communication profile, e.g. via a ES9+ interface to the SM-DP+ subscription manager.

At block 614, a mapping may be stored at the ECS between the network device and the verified credentials. For instance, ECS 110 may store a received enterprise ID token 114a and may create a record for device 102. In some examples, ECS may create an MNO identity that points to a subscription or account record for device 102. The record may include a mapping between device 102 and the verified enterprise credentials.

In some examples, the stored record of device 102 may include the received enterprise credentials, such as the enterprise ID and device ID described above, as well as the received authentication tokens, including MNO token 112a and enterprise ID token 114a. The record may further include an MNO Subscription ID. The MNO Subscription ID may be a unique identity from the Mobile Operator, and may generally be referred to as a mobile subscriber identity, or international mobile subscriber identity (IMSI). The IMSI is a unique number that identifies a Global System for Mobile Communications (GSM) subscriber, i.e. a user of a cellular network. Thus, the unique identity of the device from the MNO may be mapped to an enterprise identity.

At block 616, a request may be received from a wireless controller, e.g. a Wi-Fi controller, to access the enterprise network. For example, device 102, after being onboarded, may connect to Wi-Fi controller 312, e.g. via Wi-Fi Access Point 310 of FIG. 3. In an example implementation, device 102 may be authenticated by Wi-Fi controller 312, e.g. via standard authentication protocols such as Extensible Authentication Protocol (EAP). The Wi-Fi controller may then exchange standards-based authentication commands with EAP-AKA payloads from SIM 102a of device 102 with ECS 110. In an example, the exchange may be on top of a Remote Authentication Dial-In User Service (RADIUS) authentication protocol, a standard networking application layer protocol that provides centralized Authentication, Authorization, and Accounting (AAA) management for connecting to a network service. In other words, ECS 110 may receive the access request, e.g. in the form of a RADIUS AAA message, from the Wi-Fi controller.

ECS 110, in an example implementation, may include a client for communicating with a AAA server, e.g. server 314. From the stored mapping at ECS 110, ECS 110 may pull the stored enterprise credentials of device 102, e.g. the MNO token 112a, and enterprise Identity (ID) token 114a, and may, in some example implementations, exchange AKA-based authentication credentials with AAA server 314, as well as with Enterprise Authentication Server 114.

At block 618, enterprise credentials may be passed to the wireless controller responsive to the access request. For instance, upon successful authentication, ECS 110 may transmit a final "accept connect" message back to Wi-Fi controller 312. Accordingly, the network device 102 may be onboarded such that a verified user may seamlessly and autonomously access a private network, such as an enterprise network.

Figure 7:
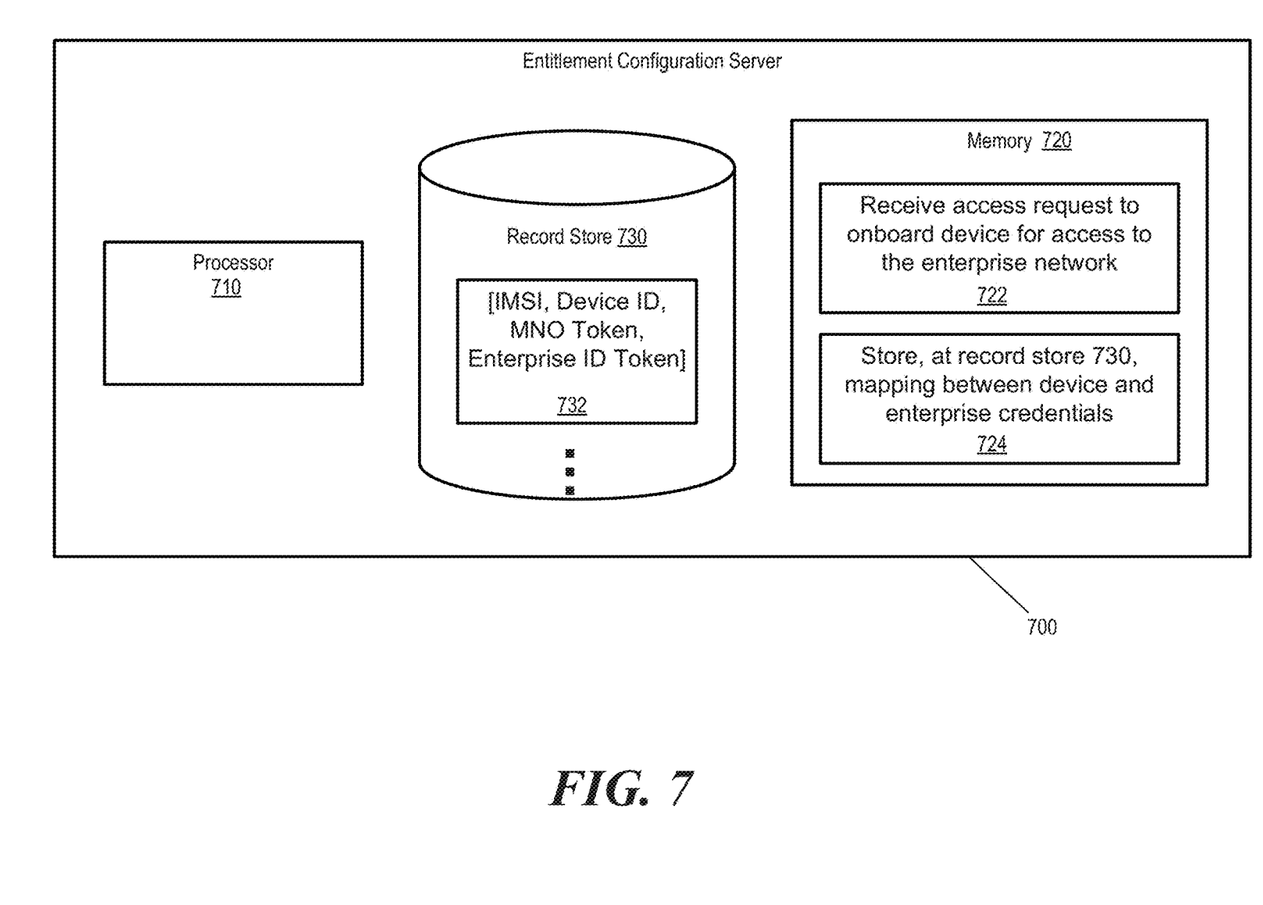
FIG. 7 is a block diagram illustrating an example entitlement configuration server for granting a network device access to an enterprise network.

FIG. 7 is a block diagram illustrating an example Entitlement Configuration Server (ECS) 700. ECS may be deployed for example, at an MNO Domain, such as example ECS 110 at Mobile Network Operator (MNO) Domain 103 of example FIG. 1. ECS 700 may be a gateway, such as a Device Entitlement Gateway (DEG) that interfaces between a network device and an MNO core network. ECS 700 may process device-related requests to entitle and/or configure features or services on the network device. ECS 700 may further orchestrate the handling of requests between a network device and/or a Mobile Device Manager (MDM), and an MNO domain. ECS 700 may be computer hardware of a combination of hardware and software for connecting a network device to an enterprise network. Although ECS 700 is illustrated as a single device for purposes of clarity and conciseness, ECS 700 may be spread across multiple hardware devices.

ECS 700 may include a processor 710. Processor 710 may be a central processing unit (CPU), graphics processing unit (GPU), microprocessor, and/or any other hardware device suitable for retrieval and execution of instructions stored in computer readable memory, e.g. memory 720. Processor 710 may represent any number of physical processors capable of executing instructions stored at memory 720. Furthermore, processor 710 (and any other processor described herein) may be implemented by any number of processing resources (e.g., processor(s), processor core(s), etc.). While processor 710 is illustrated as local to ECS 700, processor 710 may execute instructions of memory 720 remotely, and may be spread among any number of devices.

Processor 710 may fetch, decode, and execute example program instructions 722-724, and/or other instructions. As an alternative or in addition to retrieving and executing instructions, processor 710 may include at least one electronic circuit comprising a number of electronic components for performing the functionality of instructions 722-724, and/or other instructions. Similarly, processor 710 may include at least one electronic circuit comprising a number of electronic components for performing the functionality of instructions 722-724, and/or other instructions.

ECS 700 may further include memory 720 having instructions 722-724 for seamlessly authenticating a network device. As described above instructions 722-724 may be executed by processor 710. Memory 720 may specifically include instructions 722 for receiving an access request to onboard a network device. As described above, an authorization request may be received to access a private network, such as an enterprise network. In an example implementation, the authorization request may be received from a Mobile Device Manager (MDM).

In some examples, the authorization request may include enterprise credentials. In an example implementation, enterprise credentials of a device may be transmitted to ECS 700 upon initiating SIM activation for the device. In another example implementation enterprise credentials of the device may be received by ECS 700 upon the authentication of the MDM from which the credentials were received.

The enterprise credentials may include, in some examples, a device identifier (ID) of the requesting device. The Device ID may be a unique identifier, such as a unique string of alphanumeric characters, to uniquely identify the device. The device ID may be globally unique in some instances, and may, for example, map to a specific end user. Where the device is an enterprise device, the device ID may be unique to the enterprise. Enterprise credentials of the device may further include an enterprise ID in some examples. The enterprise ID may be private access credentials of a user, such as an employee, customer ect., to access an enterprise network, services, or other resources under management of the enterprise. An enterprise ID may include, in some examples, a registered email and password, an employee ID number, or other credentials granted to a specific individual or entity for access to an enterprise network.

Memory 720 may further include instructions 730 for storing a mapping between the device and the received enterprise credentials, e.g. at record store 730. Record store 730 may include volatile and/or non-volatile memory for storing data records. For instance, as described above, the ECS may store a received enterprise ID token and may create a record for the requesting device, e.g. record 732. Although one example record 732 is illustrated, ECS may store any number of records. Record 732 may include a mapping between the device and the verified enterprise credentials.

In some examples, the stored record 732 of device may include the received enterprise credentials, such as the enterprise ID and device ID described above, as well as the received authentication tokens, including MNO token 112a and enterprise ID token 114a. The record may further include an MNO Subscription ID. The MNO Subscription ID may be a unique identity from the Mobile Operator, and may generally be referred to as a mobile subscriber identity, or international mobile subscriber identity (IMSI). The IMSI is a unique number that identifies a Global System for Mobile Communications (GSM) subscriber, i.e. a user of a cellular network. Thus, the unique identity of the device from the MNO may be mapped to an enterprise identity for future authentication by ECS 700.

Figure 8:
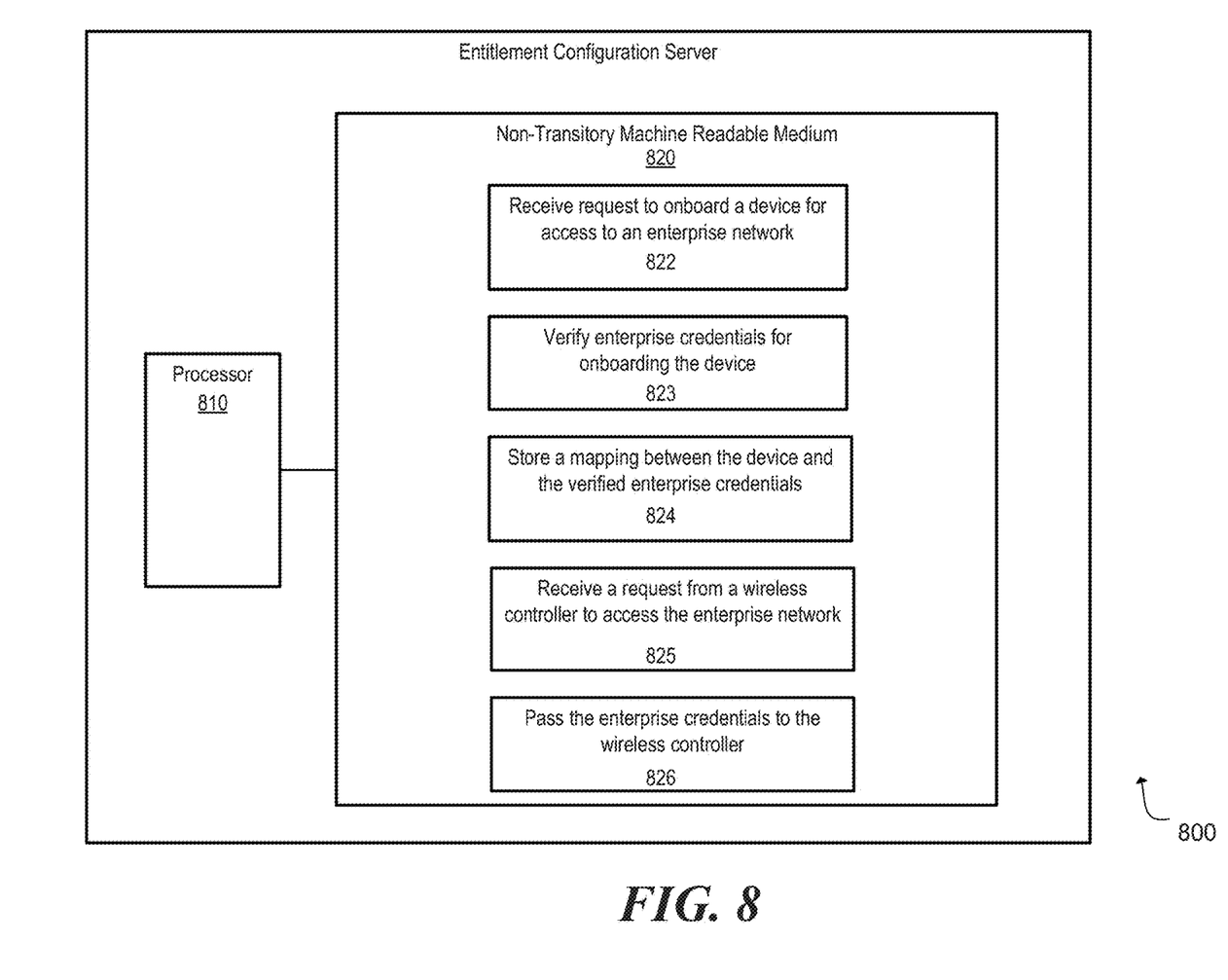
FIG. 8 is a block diagram illustrating another example entitlement configuration server for granting a network device access to an enterprise network.

FIG. 8 is a block diagram illustrating another example Entitlement Configuration Server (ECS) 800 for seamlessly authenticating a network device for access to a private network. ECS 800 may include a processor 810. Processor 810, like processor 710 as described above, may be a central processing unit (CPU), graphics processing unit (GPU), microprocessor, and/or any other hardware device suitable for retrieval and execution of instructions stored in non-transitory machine readable medium 820. Processor 810 may represent any number of physical processors capable of executing instructions stored at non-transitory machine readable medium 820.

Furthermore, processor 810 (and any other processor described herein) may be implemented by any number of processing resources (e.g., processor(s), processor core(s), etc.). While processor 810 is illustrated as local to ECS 800, processor 810 may execute instructions of non-transitory machine readable medium 820 remotely, and may be spread among any number of devices.

Processor 810 may fetch, decode, and execute example program instructions 822-826, and/or other instructions. As an alternative or in addition to retrieving and executing instructions, processor 810 may include at least one electronic circuit comprising a number of electronic components for performing the functionality of instructions 822-826, and/or other instructions. Similarly, processor 810 may include at least one electronic circuit comprising a number of electronic components for performing the functionality of instructions 822-826, and/or other instructions.

As used herein, a "machine readable medium" may be any electronic, magnetic, optical, or other physical storage apparatus to contain or store information such as executable instructions, data, and the like. For example, any machine readable medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine readable medium described herein may be non-transitory. In examples described herein, a machine readable medium or media may be part of an article (or article of manufacture). An article or article of manufacture may refer to any manufactured single component or multiple components.

Non-transitory machine readable medium 820 may include instructions 822 for receiving a request to onboard a device for access to a private network, such as an enterprise network. In an example implementation, the authorization request may be received from a Mobile Device Manager (MDM). For instance, the MDM may be a platform for onboarding and configuring devices for access to an enterprise network. MDM 104 may include an on-premise or cloud based server for transmitting data, system configurations, commands, etc., to the device requesting access to the enterprise network. In some examples, the authorization request may include enterprise credentials as described above. For instance, the MDM may transmit enterprise credentials of the device requesting access to the enterprise network to ECS 800.

Non-transitory machine readable medium 820 may further include instructions 823 for verifying the received enterprise credentials. For example, ECS 800 may transmit the credentials to an Enterprise Authentication Server (EAS). Responsive to receiving the enterprise credentials from ECS 800, the EAS may validate and otherwise authorize the enterprise credentials. EAS may, in some example implementations, validate the enterprise credentials and, responsive to the validation, pass an enterprise identity (ID) token to ECS 800 to confirm the validation.

Non-transitory machine readable medium 820 may further include instructions 824 for storing a mapping between the device requesting access to the private network and the verified enterprise credentials. For instance, ECS 800 may store the received enterprise ID token and may create a record for the device. In some examples, ECS may create an MNO identity that points to a subscription or account record for the device. The record may include a mapping between the device and the verified enterprise credentials.

In some examples, the stored record of the device may include the received enterprise credentials, such as the enterprise ID and device ID described above, as well as received authentication tokens, including, for example, an MNO token and and/or enterprise ID token as described above. In some example implementations, the record may further include an MNO Subscription ID. The MNO Subscription ID may be a unique identity from the Mobile Operator, and may generally be referred to as a mobile subscriber identity, or international mobile subscriber identity (IMSI). The IMSI is a unique number that identifies a Global System for Mobile Communications (GSM) subscriber, i.e. a user of a cellular network. Thus, the unique identity of the device from the MNO may be mapped to an enterprise identity.

Non-transitory machine readable medium 820 may further include instructions 825 to receive a request from a wireless controller to access the enterprise network. For example, the requesting device, after being onboarded, may connect to the wireless controller to access the private network as described in the examples above.

Non-transitory machine readable medium 820 may further include instructions 826 to pass the enterprise credentials to the wireless controller responsive to the access request. For instance, upon successful authentication, ECS 800 may transmit a final "accept connect" message back to the wireless controller. This "accept connect" message transmitted to the wireless controller may, for example, include the enterprise identifier and device identifier as described above. Accordingly, ECS 800 may seamlessly authenticate a network device for access to a private network.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method comprising:
    onboarding a network device, the onboarding including:
        receiving an access request from a Mobile Device Manager (MDM) for the device to access an enterprise network, wherein the access request includes enterprise credentials;
        verifying the enterprise credentials with an Enterprise Authentication Server (EAS), the verification including:
            transmitting the access request to a Mobile Network Operator (MNO); and
            receiving an MDM authentication token from the MNO responsive to the MNO validating the MDM, the authentication token to enable authenticated communication between an Entitlement Configuration Server (ECS) and the MDM; and
        responsive to verifying the enterprise credentials, storing, at the ECS, a mapping between the device and the verified enterprise credentials;
    granting access to the network device to connect to the enterprise network, including:
        receiving an access request, from a wireless controller for the device to access the enterprise network; and
        responsive to the access request, passing the enterprise credentials to the wireless controller.

2. The method of claim 1, further comprising storing the authentication token, responsive to the validation of the MDM, to enable authenticated communication between the ECS and the MDM.

3. The method of claim 1, wherein validating the MDM includes an OAuth 2.0 exchange between the MDM and the MNO authentication server.

4. The method of claim 1, wherein onboarding the network device further comprises reserving a communication profile from a subscription manager.

5. The method of claim 1, wherein onboarding the network device further comprises passing an activation code to the MDM for downloading the communication profile to the device.

6. A system for connecting a device to an enterprise network comprising:
    an entitlement configuration server (ECS), the ECS including:
        a processor;
        a record store including at least one mapping between the device and enterprise credentials of the device; and
        a memory including instructions that when executed by the processor cause the processor to:
            receive an access request from a Mobile Device Manager (MDM) including enterprise credentials to onboard the device for access to the enterprise network; and
            responsive to the access request, store, at the record store of the ECS, a mapping between the device and the enterprise credentials, wherein the ECS, upon receiving a request from a wireless controller for the device to access the enterprise network, passes the enterprise credentials to the wireless controller and
    a Mobile Network Operator (MNO) authentication server, the MNO authentication server to:
        receive the access request including enterprise credentials to onboard the device for access to the enterprise network from the ECS; and
        validate the MDM from which the access request was received.

7. The system of claim 6, further comprising an Enterprise Authentication Server (EAS) for authenticating the enterprise credentials, wherein the ECS, responsive to receiving the access request, verifies the enterprise credentials with the authentication server.

8. The system of claim 7, wherein the authentication server, upon verifying the enterprise credentials, returns an enterprise identity token to the ECS.

9. The system of claim 6, wherein the enterprise credentials include a unique enterprise identifier and device identifier.

10. The system of claim 6, wherein the mapping between the device and enterprise credentials of the device stored at the record store includes a record having an international mobile subscriber identity (IMSI), device identifier, Mobile Network Operator (MNO) token, and enterprise identity token.

11. A non-transitory computer readable medium including instructions thereon for connecting a device to an enterprise network, wherein the instructions, when executed by a processor, cause the processor to:
   receive a request to onboard a device for access to the enterprise network;
   verify, upon receiving the onboard request, enterprise credentials for onboarding the device for access to the enterprise network, the enterprise credentials including at least an enterprise identifier and a device identifier, and the verification including:
      transmitting the access request to a Mobile Network Operator (MNO); and
      receiving an MDM authentication token from the MNO responsive to the MNO validating the MDM, the authentication token to enable authenticated communication between an Entitlement Configuration Server (ECS) and the MDM;
   responsive to verifying the enterprise credentials, store a mapping between the device and the verified enterprise credentials;
   receive a request, from a wireless controller to access the enterprise network; and
   responsive to the access request, pass the enterprise credentials to the wireless controller.

12. The non-transitory computer readable medium of claim 11, wherein the request received from the wireless controller is transmitted via a Remote Authentication Dial-In User Service (RADIUS) protocol.

13. The non-transitory computer readable medium of claim 11, wherein the mapping between the device and enterprise credentials of the device includes a record having an international mobile subscriber identity (IMSI), device identifier, MNO token, and enterprise identity token.

14. The non-transitory computer readable medium of claim 11, further comprising instructions to:
   store the authentication token to enable authenticated communication with the MDM.

15. The non-transitory computer readable medium of claim 11, wherein the enterprise credentials are verified by,
   passing the enterprise credentials to an Enterprise Authentication Server (EAS); and
   receiving an enterprise identity token verifying the authentication.

* * * * *